Aug. 8, 1950     R. T. HAMEL     2,517,872
DUAL-PURPOSE SUN VISOR
Filed April 8, 1949
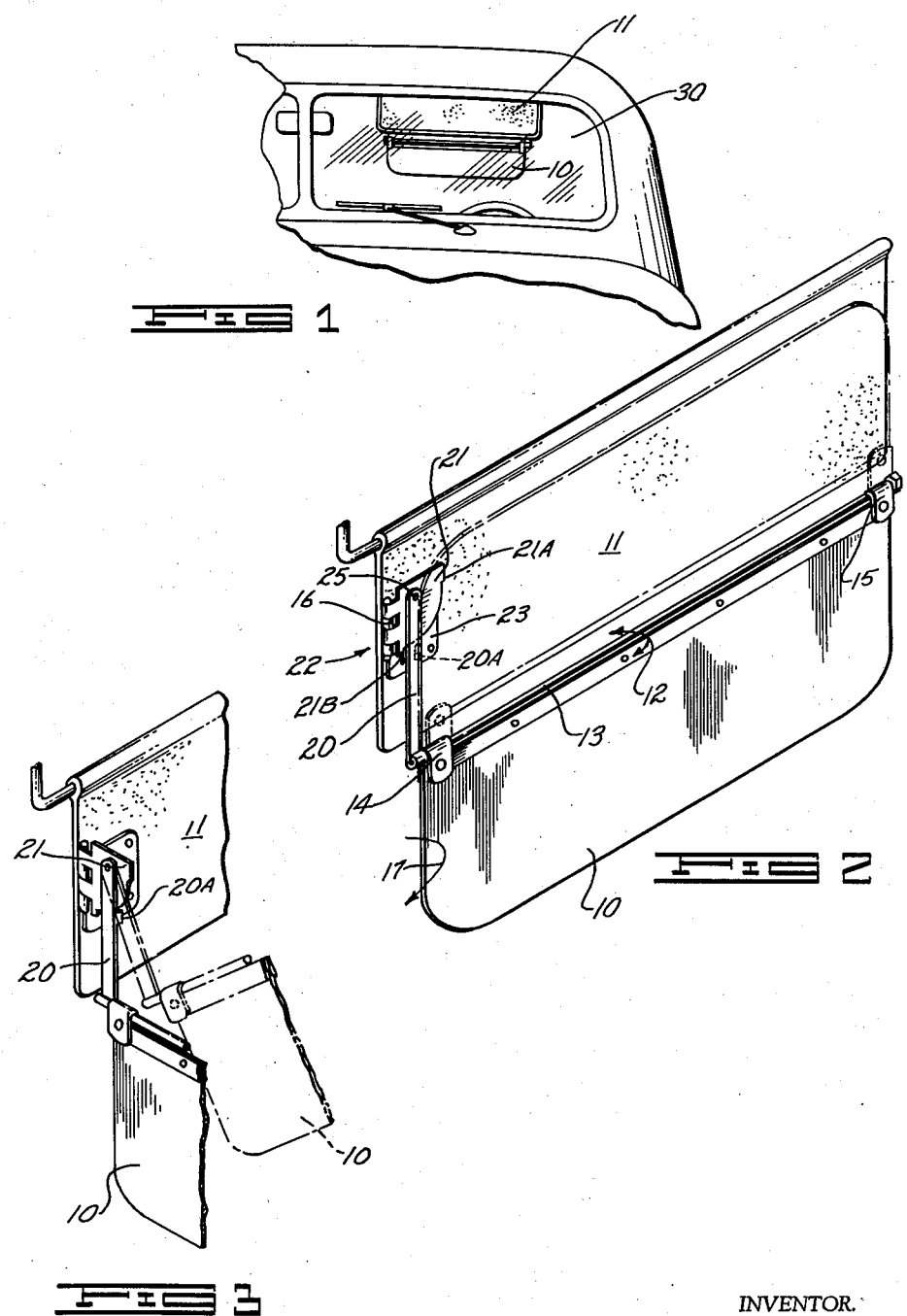
INVENTOR.
RICHARD T. HAMEL
BY
ATTORNEYS Patented Aug. 8, 1950

2,517,872

UNITED STATES PATENT OFFICE 2,517,872

DUAL-PURPOSE SUN VISOR

Richard T. Hamel, Los Angeles, Calif.

Application April 8, 1949, Serial No. 86,165

1 Claim. (Cl. 296—97)

The present invention relates to improved mounting means for sun visors and its novel association with an opaque sun visor of the type normally found in present day automobiles.

An object of the present invention is to provide an improved and simplified universally adjustable visor which may be used in connection with the conventional opaque sun visor which is present day stock equipment on automobiles.

Another object of the present invention is to provide an improved mounting for a translucent, transparent sun glare visor for universal movement on the conventional opaque sun visor normally found as stock equipment on present day automobiles.

Another object of the present invention is to provide an improved auxiliary translucent sun visor for mounting on the conventional opaque sun visor in such a manner that normally such translucent sun visor is obscured by the conventional opaque sun visor; but, the translucent sun visor may be moved to positions with its plane substantially parallel either to the plane of the front windshield or the side window of the automobile, and in general may be moved in either one of three dimensions with respect to the conventional sun visor upon which it is mounted to compensate for any particular position the opaque sun visor may assume after it is swung downwardly to a position adjacent the front windshield.

The features of the present invention which are believed to be novel are set forth with particularity in the appended claim. This invention itself, both as to its organization and manner of operation, together with further objects and advantages thereof, may be best understood by reference to the following description taken in connection with the accompanying drawings, in which Figure 1 is a view in elevation of that portion of an automobile showing the steering wheel and the visor and its mounting embodying features of the present invention;

Figure 2 is a perspective view of the improved visor and improved mounting shown in Figure 1; and Figure 3 illustrates other positions in which the improved mounting may hold the sun visor in adjusted positions.

The translucent, transparent sun visor 10, which may be of green or amber plastic material, is arranged to be fastened to the conventional opaque sun visor 11 normally found as stock equipment on present day automobiles. The sun visor 11 shown in the drawings is the left front one positioned in front of the windshield adjacent to the driver's seat and is shown in its lowered position in each one of Figures 1, 2 and 3. Important features of the present invention reside in the manner in which the transparent visor 10 is mounted for movement to the various positions indicated in Figures 2 and 3. Normally the visor 10, when conditions are such that neither the visor 10 nor 11 is moved to extended useful position, the visor 10 is mounted with its plane substantially parallel and adjacent to the plane of the opaque visor 11 by rotating the visor 10 in the direction indicated by the arrow 12 about the shaft 13 which frictionally engages the U-shaped friction bearing means 14, 15 on the visor 10.

The shaft 13 is rigidly affixed to one end of arm 20, the other end of arm 20 being pivotally and frictionally mounted on the leaf 21 of the hinge 22, the other leaf 23 of hinge 22 being attached to the opaque visor 11 with the hinge pin 16 adjoining the leaves 21, 23 extending parallel and adjacent to the left-hand edge of the visor 11. More specifically, the arm 20 is pivoted by means of pin 25 on the hinge leaf 21 which is shaped in the form of a quadrant to allow pivotal movement of the arm 20 through an angle of approximately 45° defined by the spaced stop members 21A, 21B thereon. The connection between the arm 20 and the quadrant plate or leaf 21 is such that the arm 20, shaft 13 and the visor 10 supported thereon may be frictionally held in different adjusted positions with respect to the plate 21.

It is noted that the hinge 22 is, in fact, mounted on the back side of the conventional visor 11. By back side of the visor, I mean that side of the visor 11 which is obscured from vision when it is moved up to its retracted position to allow full vision through the front windshield 30 of the automobile. Thus, with the visor 10 folded upwardly in the direction indicated by the arrow 12 in Figure 2 and with the opaque visor 11 moved to its normally retracted position, the ringe 22 and the visor 10 are substantially obscured from vision.

Referring again to Figure 2, it is apparent that the sun visor 10 shown therein affords some protection against sun rays coming in to the driver's compartment through the front windshield 30; also, it is noted that the sun visor 10 may be rotated in the direction indicated by the arrow 17 about the axis of the hinge pin 16 to the position shown in full lines in Figure 3 to afford protection against the sun rays coming in through the left front window, as shown in Figure 3. Further, it is noted that the visor 10 may be moved to different adjusted positions as indicated in the dotted lines in Figure 3.

It is thus demonstrated that the visor 10 may be moved in either one of three dimensions with respect to the visor 11.

It is thus apparent that a "tandem" visor structure has been provided which incorporates an auxiliary sun visor 10 readily adaptable to existing opaque sun visors 11 for attachment and use therewith.

If desired, the arm may take different forms and shapes, but in general is provided with an abutment 20A thereon for cooperation with the spaced stops 21A, 21B.

It is desired to fabricate the mounting structure for visor 10 of light weight metal such as of aluminum alloys.

While the particular embodiments of the present invention have been shown and described, it will be obvious to those skilled in the art that changes and modifications may be made without departing from this invention in its broader aspects and, therefore, the aim in the appended claim is to cover all such changes and modifications as fall within the true spirit and scope of this invention.

I claim:

In combination with the conventional opaque sun visor found in present day automobiles of the type in which said opaque sun visor may be moved from an upper retracted position to a lower sun-obscuring position to expose the back surface thereof to occupants of the automobile, a leaf type of hinge having one of its leaves mounted on said back side with the pivoted axis of the hinge extending substantially parallel to and adjacent one vertical edge of said opaque visor, the other leaf of said hinge mounting thereon one end of a pivoted arm frictionally maintained in different adjusted pivoted positions, the other end of said arm having mounted thereon a shaft extending substantially perpendicular to the axis of said arm and arranged to frictionally support a sun visor for pivoted movement thereon to adjusted positions.

RICHARD T. HAMEL.

REFERENCES CITED

The following references are of record in the file of this patent:

UNITED STATES PATENTS

| Number | Name | Date |
|---|---|---|
| 2,112,726 | Kemp et al. | Mar. 29, 1938 |
| 2,231,641 | Schwab | Feb. 11, 1941 |
| 2,261,881 | Horstmann | Nov. 4, 1941 |